Oct. 21, 1969  W. J. KRAUSE  3,473,635
DISC ELEMENT CONSTRUCTION FOR DISC BRAKE
Filed March 28, 1968  3 Sheets-Sheet 1

INVENTOR.
WALTER J. KRAUSE
BY
William N. Antonis
ATTORNEY

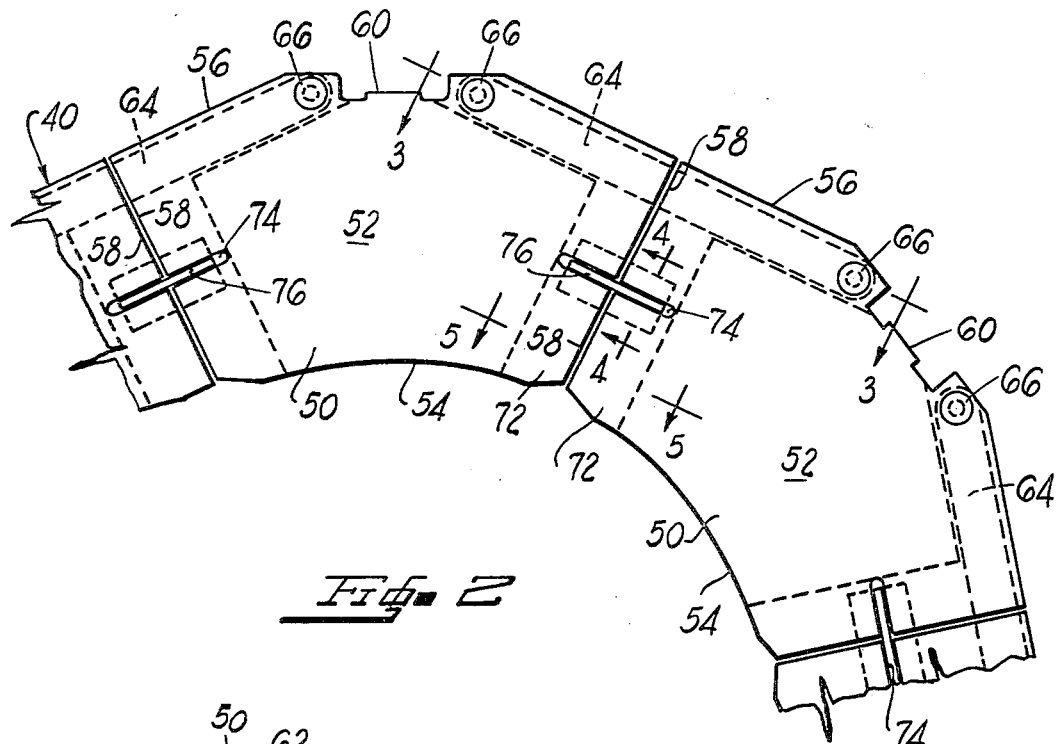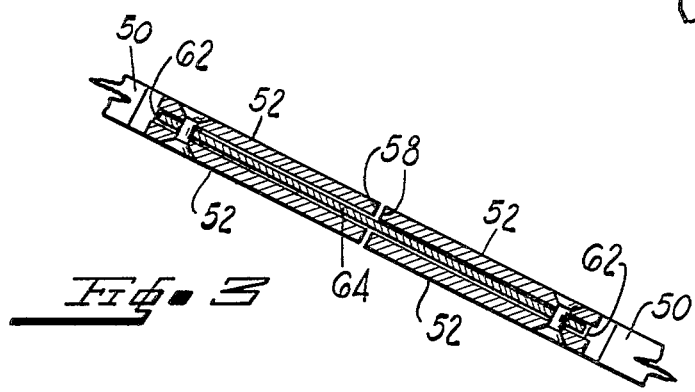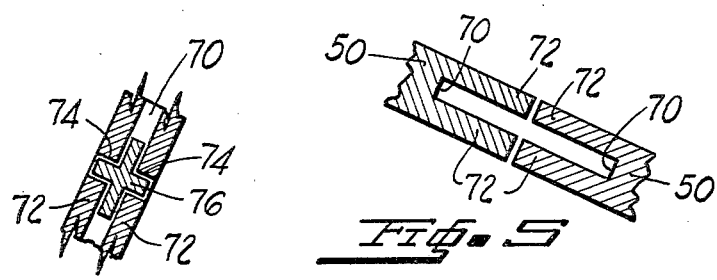

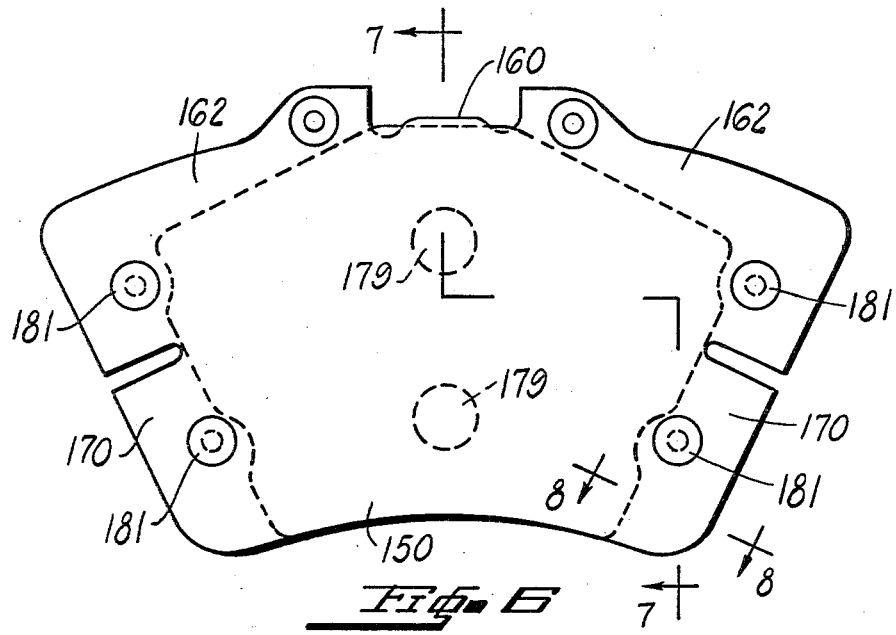
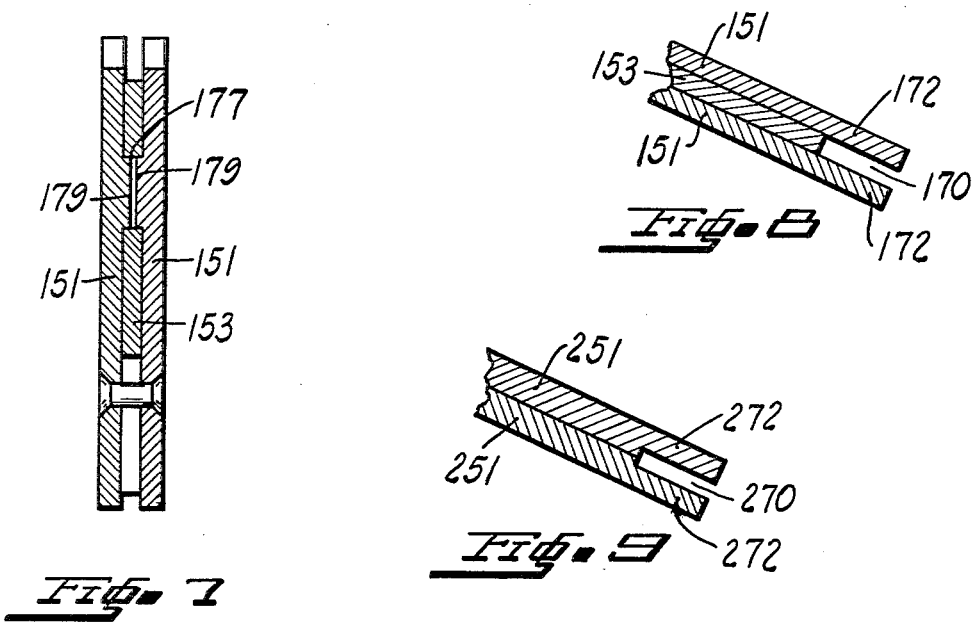

United States Patent Office 3,473,635
Patented Oct. 21, 1969

3,473,635
DISC ELEMENT CONSTRUCTION FOR
DISC BRAKE
Walter J. Krause, South Bend, Ind., assignor to The
Bendix Corporation, a corporation of Delaware
Filed Mar. 28, 1968, Ser. No. 716,902
Int. Cl. F16d 65/12
U.S. Cl. 188—218                            9 Claims

ABSTRACT OF THE DISCLOSURE

The following relates to a friction disc element construction for a disc brake which is formed of a plurality of interconnected annularly arranged segments wherein the interconnection includes a plurality of restrained link members. Each of the segments includes a groove in the radially extending ends thereof for providing opposed cantilever-like flat projections capable of flexing towards each other.

BACKGROUND OF THE INVENTION

Disc brakes which utilize segmented annular disc elements arranged to permit individual thermal expansion of the disc segments without interference between adjacent segments are shown and described in various prior art patents, such as U.S. Patents 2,423,881, 2,531,696, 2,683,504, 2,893,519, and 3,237,731. All disc brake elements to a greater or lesser degree, including those shown in the foregoing patents, tend to warp and wear upon extensive encounters with thermal shocks. Such warp and wear obviously will have a direct bearing on the effectiveness and life of any brake. In other words, higher degrees of warp and wear will reduce brake effectiveness and brake life, whereas, lesser degrees of warp and wear will increase brake effectiveness and brake life. Accordingly, any disc element construction which would eliminate or substantially reduce such warp and wear would constitute a significant advance in the art, and, particularly so, if such construction is less expensive than disc elements which are presently in use.

SUMMARY OF THE INVENTION

Accordingly, in view of the foregoing, it is an object of this invention to provide a unique friction disc element of the segmented type which will increase brake effectiveness and extend brake life.

Another object of this invention is to provide a segmented disc element which absorbs heat in a more uniform manner and withstands thermal shocks better than existing disc elements.

A further object of this invention is to provide a segmented disc element which is less expensive to fabricate than existing disc elements.

A still further object of this invention is to provide a unique segmented disc element having relatively few components which can, if desired, be fabricated into thinner disc elements so that a greater number of disc elements can be utilized in a given brake package to increase the braking capacity thereof.

An important object of this invention is to provide a segmented disc element wherein each segment is formed so that the oppositely disposed faces of each segment are capable of flexing towards each other at the leading and trailing ends thereof.

More specifically, it is an object of this invention to provide a segmented disc element wherein each segment includes a radially extending groove in the radially extending ends thereof for providing opposed cantilever-like flat projections capable of flexing towards each other. This flexibility feature is an important factor in reducing the wear rate of the disc brake elements.

Another object of this invention is to provide a segmented disc element wherein the segments are interconnected by restrained links, the ends of which are connected to annularly adjacent segments along the radially outer edge thereof at a point substantially intermediate the leading and trailing ends of the segments to minimize the effects of shrinkage therein.

The advantages of this unique segmented disc element construtcion over existing commercial constructions are decidedly significant. More particularly, the hereinafter described segmented disc element is self-compensating when encountering thermal shocks thereby permitting higher brake effectiveness and extended brake life. While existing brake components tend to warp and wear upon extensive encounters with thermal shocks, the instant construction has decreased warpage and wear under severe service conditions. Because of the foregoing higher brake effectiveness, it is also possible to utilize simpler brake constructions and reduce service life maintenance, since fewer rotating parts are required to perform at a given level. Furthermore, by forming each segment of the disc element out of three juxtaposed plates, it is possible to eliminate the high cost of milling circumferential and radial grooves therein since the grooves can be created at the desired locations simply by utilizing a dimensionally different middle plate. Cost savings are also possible if each segment is formed of two juxtaposed plates having the circumferential and radial grooves coined therein. Further cost savings are achieved because of the extended brake life and the reduction in required brake maintenance.

Other objects, features and advantages of the invention will be apparent from the following description of the invention taken in connection with the accompanying drawings.

BRIEF DESCRIPTION OF THE DRAWINGS

FIGURE 2 is a side elevation of a portion of a symmetrical rotor removed from the brake assembly of FIGURE 1;

FIGURE 3 is a sectional view taken along line 3—3 of FIGURE 2;

FIGURE 4 is an enlarged sectional view taken along line 4—4 of FIGURE 2;

FIGURE 5 is an enlarged sectional view taken along line 5—5 of FIGURE 2;

FIGURE 6 is an enlarged side elevation of a laminated segment formed of three plates for use in the rotor of FIGURE 2;

FIGURE 7 is a sectional view taken along line 7—7 of FIGURE 6;

FIGURE 8 is a sectional view taken along line 8—8 of FIGURE 6; and

FIGURE 9 is a sectional view, similar to that of FIGURE 8, showing another embodiment of the invention wherein the segment is formed of only two plates.

DESCRIPTION OF THE PREFERRED EMBODIMENTS

Figure 1:
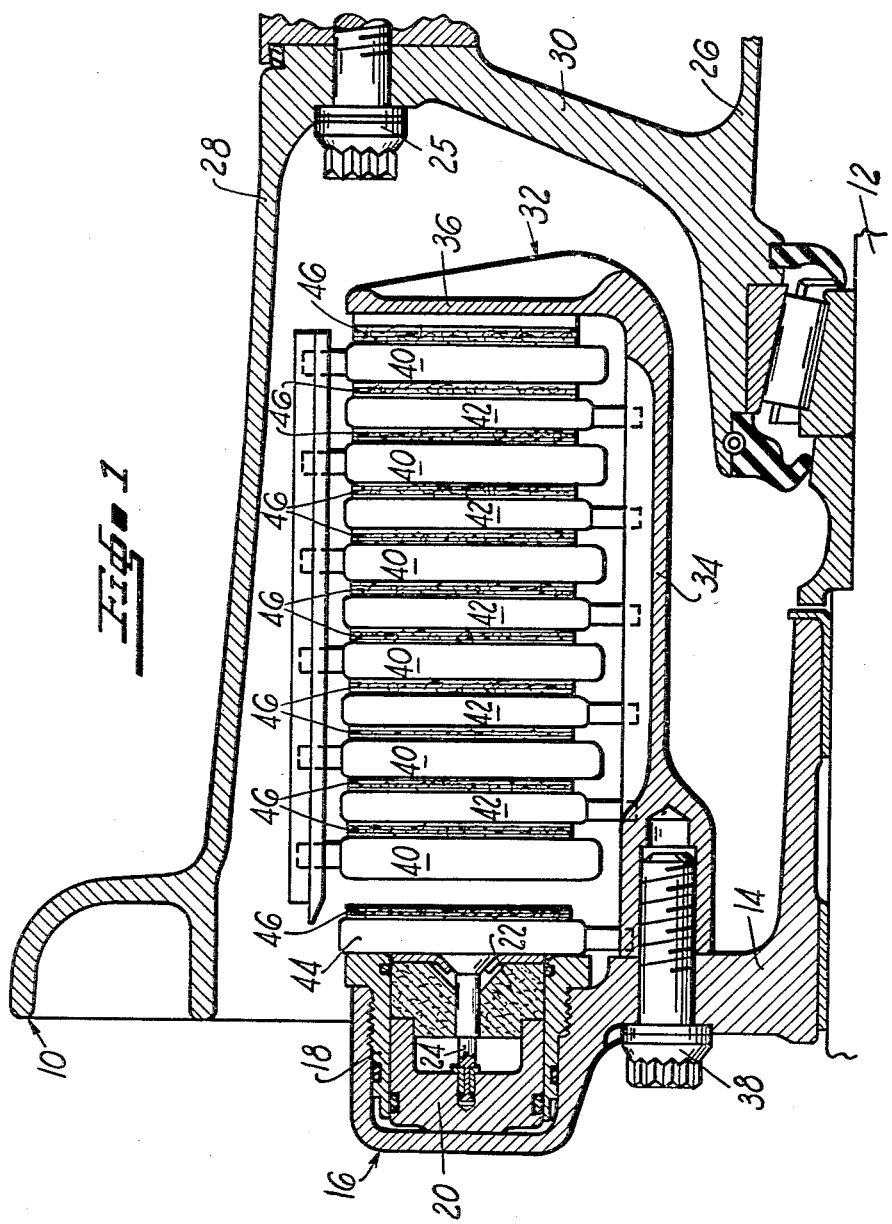
FIGURE 1 is a sectional view of a portion of a symmetrical wheel and brake assembly which incorporates the invention.

Referring to FIGURE 1, it will be seen that the wheel and brake assembly, which is illustrated, includes a wheel 10 rotatably mounted on a stationary axle 12 and a stationary carrier member 14, which is connected to the axle through any suitable means, such as by a direct bolt connection (not shown). The construction for rotatably mounting the wheel 10 to axle 12 and fixing the stationary carrier member 14 to the axle 12 is well known, and a detailed description thereof is not deemed to be necessary. The carrier contains a plurality of fluid motors 16 each of which includes a protective sleeve 18 threadedly secured to the carrier and a piston 20 located and slidable in the sleeve. A block of insulating material 22 is secured to the head end of the piston by a threaded pin 24 for protecting the hydraulic brake fluid from the heat generated during braking. The wheel 10, which is formed of two sections fastened together by a plurality of bolts 25, includes a hub portion 26 and a rim portion 28 interconnected by a plurality of spokes 30. A torque tube 32 which includes a sleeve 34 and an annular backing plate flange 36 is fixedly secured to the carrier member 14 by a plurality of circumferentially spaced bolts 38.

The brake which is illustrated is of the disc type and includes a plurality of interleaved rotors 40, which are splined to and are rotated by the aircraft wheel 10, and includes stators 42, which are splined to sleeve 34 of the torque tube 32. The specific novel construction of the rotors will be described hereafter. Both the rotors and stators are movable axially and are sometimes referred to as a brake "stack." It is the frictional engagement of these relatively rotatable rotors and stators which produces the desired braking action on the aircraft wheel. A pressure plate 44, which is suitably attached to the fluid motor 16, forces the rotors 40 and stators 42 against each other upon actuation of the motors by thrusting at one side of the stack and biasing the entire stack against the backing plate 36. Pressure plate 44, each of the stators 42, and the backing plate have friction material lining 46 provided thereon.

Referring to FIGURES 2–5, which show the novel detailed construction of each of the rotors 40, it will be seen that each rotor is comprised of a plurality of annularly arranged segments 50, each of which has oppositely disposed faces 52, a radially inner edge 54, a radially outer edge 56, and two angularly disposed ends 58 extending between the edges. A key slot notch 60 is located at the radially outer edge 56 and intermediate the ends 58 of each of the segments. Each of these notches slidably engage axially extending keys located on the inner periphery of the aircraft wheel 10. It will be understood that, if desired, the key-slot arrangement could be reversed so that the slot is formed in the wheel and the key is formed on the outer edge of each segment 50.

Circumferentially extending grooves 62 are located in the radially outer edge 56 of each of the segments and extend from both ends 58 of each segment to the key slot notch 60 of each segment. A plurality of link members 64 are located in the circumferentially extending grooves 62 and are utilized to interconnect the segments to form an annular disc. More specifically each link member has the ends 66 thereof connected to annularly adjacent segments substantially at the location of the key slot notch 60. By connecting the ends of the link member as close to the key slot notches as possible, that is, as close as possible to an intermediate position of the segment, the effects of shrinkage are minimized.

In order to reduce the wear rate of the disc element segments and thus increase the life thereof, each of the segments 50 is formed with radially extending grooves 70 which are located in the leading and trailing ends 58 of the segment. These grooves 70 provide opposed cantilever-like flat projections 72 which are capable of flexing towards each other. This resulting flexibility at the leading and trailing edges of each segment prevents the segment from, in effect, "plowing" through the surface of the adjacent disc element and thus increases the life of the disc elements by reducing lining wear and wear on the segments.

Each of the cantilever-like flat projections is slotted at 74 to form a cross-shaped recess with the associated radially extending groove 70 which is directly opposite a corresponding cross-shaped recess on the next adjacent segment. A circumferentially extending member 76 having a cruciform-type cross section is interposed between each pair of annularly adjacent segments and extends into the oppositely disposed cross-shaped recesses in order to take the shear loads which arise during braking.

Although the invention has been described in connection with solid segments 50, it can be seen from FIGURES 6–9 that laminated segments could be substituted in place of the solid segments. Such laminated constructions permit relative thermal expansion between the laminations and have been found to have excellent self-compensating features when encountering thermal shocks which tend to cause warpage and wear. This self-compensating feature results in decreased warpage and wear and thereby permits higher brake effectiveness and extended brake life. In addition, a laminated structure of this type has self-damping characteristics which minimize undesirable vibrations in the landing gear. Furthermore, by utilizing a laminated segment construction, it is possible to eliminate the high cost of milling the necessary grooves in a solid segment. Referring specifically to FIGURES 6–8, wherein like parts are designated by like numbers plus 100, it will be seen that each segment 150 includes a pair of oppositely disposed outer plates 151 and a dimensionally smaller inner plate 153 sandwiched therebetween, said plates being arranged to form circumferentially extending grooves 162 and radially extending grooves 170. The outer plates 151 each contain a key-slot notch 160, and the portions 172 thereof which overhand the edge of the inner plate 153 provide the opposed cantilever-like flat projections which are capable of flexing towards each other. It will be noted from the arrangement of plates shown in FIGURE 7 that the inner plate, which functions as a spacer between the outer plates, includes a pair of holes 177 for receiving the protrusions 179 which extend from the outer plates 151. A pair of rivets 181 located near each end of the segment and a pair of rivets adjacent the key-slot notch 160 extend only through the outer plates 151 to hold the plates together. With such an arrangement the protrusions tend to eliminate, or at least significantly reduce, the shear forces to which the rivets might otherwise be subjected.

Although FIGURES 6–8 illustrate a three-plate laminated structure incorporating the invention, it can be seen from the sectional view of FIGURE 9 that a two-plate laminated structure incorporating the invention can also be utilized. In this embodiment the oppositely disposed outer plates 251 are rabbetted at the ends thereof to form the radially extending groove 270 and the opposed cantilever-like flat projections 272 which are capable of flexing towards each other.

The two-ply segment construction has an advantage thermodynamically of having only one interface located at the midpoint in the thickness of the segment. This allows better heat conductivity to the core of the heat sink member thereby reducing surface temperatures encountered on the friction surface. It also will reduce or eliminate thermal ratchetting which can occur in the three-ply segments. Another advantage of the two-ply construction is that it can be manufactured more economically since there are only two pieces to handle and since the required segment grooves can be coined in the contacting faces of the plates.

The several practical advantages which flow from this invention are believed to be obvious from the foregoing description, and other advantages may suggest themselves to those who are familiar with the art to which the invention relates.

Furthermore, although this invention has been described in connection with certain specific embodiments, it will be obvious to those skilled in the art that various changes may be made in the form, structure, and arrangement of parts without departing from the spirit of the invention. For example, although the drawings disclose the invention in connection with a rotor it will be understood that the invention could be utilized in connection with a segmented stator. In addition the key-slot engaging means need not necessarily be located on the radially outer edge of the segment, but could also be located on the radially inner edge, if desired.

In other words, depending on the wheel and brake arrangement, the rotors could be driven from the outer or inner diameter thereof, as required, and the stators could, likewise, be keyed to a torque member at the outer or inner diameter thereof, as required. Accordingly, I do not desire to be limited to the specific embodiments disclosed herein.

Having thus described the various features of the invention, what I claim as new and desire to secure by Letters Patent is:

1. In a wheel and brake assembly having axially extending key-slot type engaging means, a friction disc element comprising a plurality of annularly arranged segments each having oppositely disposed faces, a radially inner edge, a radially outer edge, and two angularly disposed ends extending between said edges, means for interconnecting said segments to form an annular disc, mating key-slot type engaging means operatively connected to said disc for slidable engagement with said first mentioned key-slot type engaging means, and radially extending groove means located in the ends of each of said segments and extending the full length thereof for providing opposed unsupported cantilever-like flat projections defining open radial slots substantially throughout their length when assembled and capable of substantial flexing towards each other, said projections having faces in the same planes as the oppositely disposed faces of said segments.

2. The structure, as defined in claim 1, wherein said segments are laminated segments having oppositely disposed plates each of which includes said cantilever-like flat projections at the ends thereof.

3. The structure, as defined in claim 2, wherein said segments each include an inner plate for forming said groove means with said oppositely disposed plates and spacing same from each other.

4. The structure, as defined in claim 2, wherein said oppositely disposed plates are in face-to-face contact and the ends thereof are rabbetted to form said groove means and cantilever-like flat projections.

5. In a wheel and brake assembly having axially extending key-slot type engaging means, a friction disc element comprising a plurality of annularly arranged segments each having oppositely disposed faces, a radially inner edge, a radially outer edge and two angularly disposed ends extending between said edges, mating key-slot type engaging means located at the radially outer edge of each of said segments and intermediate the ends thereof for slidable engagement with said first mentioned key-slot type engaging means, circumferentially extending groove means located in the radially outer edges of each of said segments and extending from both ends thereof to said mating key-slot type engaging means, recess means located in both of the angularly disposed ends of each of said segments, and means for interconnecting said segments to form an annular disc, said interconnecting means including a plurality of link members located in said groove means each of which has the ends thereof connected to annularly adjacent segments substantially at the location of said mating key-slot type engaging means, and a plurality of shear members, one of which is interposed between each pair of annularly adjacent segments and extends into the recess means thereof.

6. The structure, as defined in claim 5, wherein said circumferentially extending groove means are located between the oppositely disposed faces of said segments, and said link members are contained between said faces.

7. The structure, as defined in claim 6, wherein each of said segments includes radially extending groove means located in the ends thereof for providing opposed cantilever-like flat projections capable of flexing towards each other.

8. In a wheel and brake assembly having axially extending key-slot type engaging means, a friction disc element comprising a plurality of annularly arranged segments each having oppositely disposed faces, a radially inner edge, a radially outer edge, and two angularly disposed ends extending between said edges, mating key-slot type engaging means located at the radially outer edge of each of said segments and intermediate the ends thereof for slidable engagement with said first mentioned key-slot type engaging means, circumferentially extending groove means located in the radially outer edges of said segments, radially extending groove means located in the ends of each of said segments and extending the full length thereof for providing opposed unsupported cantilever-like flat projections defining open radial slots substantially throughout their length when assembled and capable of flexing towards each other, recess means formed in both of the angularly disposed ends of each segment, and means for interconnecting said segments to form an annular disc, said interconnecting means including a plurality of link members located in said circumferentially extending groove means each of which has the ends thereof connected to said segments substantially at the location of said mating key-slot type engaging means, and a plurality of shear members one of which is interposed between each pair of annularly adjacent segments and extends into the recess means thereof.

9. The structure, as defined in claim 8, wherein the opposed cantilever-like flat projections of each segment are slotted to form cross-shaped recess means with said radially extending groove means, and said shear members are circumferentially extending members having a cruciform-type cross section.

References Cited

UNITED STATES PATENTS

| | | | |
|---|---|---|---|
| 2,303,201 | 11/1942 | Eason | 192—107 X |
| 2,893,519 | 7/1959 | Martin. | |
| 3,194,347 | 7/1965 | Hall. | |
| 3,237,731 | 3/1966 | Du Bois. | |
| 3,376,961 | 4/1968 | Horner. | |
| 3,403,759 | 10/1968 | Holcomb | 192—107 X |

GEORGE E. A. HALVOSA, Primary Examiner

U.S. Cl. X.R.

192—107